United States Patent [19]

Laviolette

[11] Patent Number: 4,534,632
[45] Date of Patent: Aug. 13, 1985

[54] CAMERA-PROTECTING APPARATUS INCLUDING A FAN FOR DEFLECTING PARTICLES

[76] Inventor: André Laviolette, 1013 de la Ronde St., Quebec, Canada, G1J 4B5

[21] Appl. No.: 598,576

[22] Filed: Apr. 10, 1984

[51] Int. Cl.³ .................. G03B 29/00; G03B 17/02
[52] U.S. Cl. ................................. 354/81; 352/132; 352/242; 358/229; 355/30
[58] Field of Search .......... 354/64, 75, 76, 81, 354/288; 352/34, 35, 131, 132, 202, 211, 222, 242; 355/30; 358/229

[56] References Cited

U.S. PATENT DOCUMENTS

| | | | |
|---|---|---|---|
| 3,515,046 | 6/1970 | Ippolito et al. | 352/242 |
| 3,520,238 | 7/1970 | Webb | 354/81 |
| 3,648,323 | 3/1972 | Le Blanc . | |
| 3,911,522 | 10/1975 | Wynn et al. . | |
| 4,320,949 | 3/1982 | Pagano | 354/81 |

FOREIGN PATENT DOCUMENTS

| | | |
|---|---|---|
| 606867 | 10/1960 | Canada . |
| 789763 | 7/1962 | Canada . |
| 662077 | 4/1963 | Canada . |
| 676967 | 12/1963 | Canada . |
| 943310 | 3/1974 | Canada . |
| 972116 | 8/1975 | Canada . |

*Primary Examiner*—A. A. Mathews

[57] ABSTRACT

This apparatus deflects away from the lens of a camera dirt and the like, which may be thrown at it. The camera is enclosed within a housing with the lens protruding from the front wall of the housing. A protector plate is fixedly connected to the housing front wall by a plurality of spacers and has an opening in registry with the camera lens. A fan is rotatably mounted intermediate the circular plate and the housing front wall, with its axis of rotation eccentric with respect to the camera lens and the plate opening. The fan includes a plurality of spaced-apart blades movable across the camera lens and spacedly in front of it to deflect away from the lens any dirt particles which might enter the plate opening. The speed of the fan is such that the fan blades will not impair the quality of the image captured by the lens.

8 Claims, 8 Drawing Figures

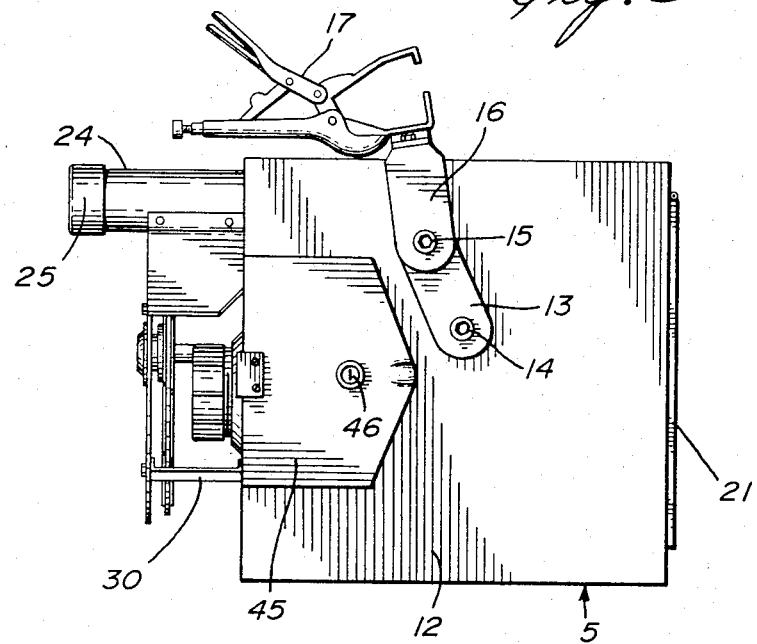
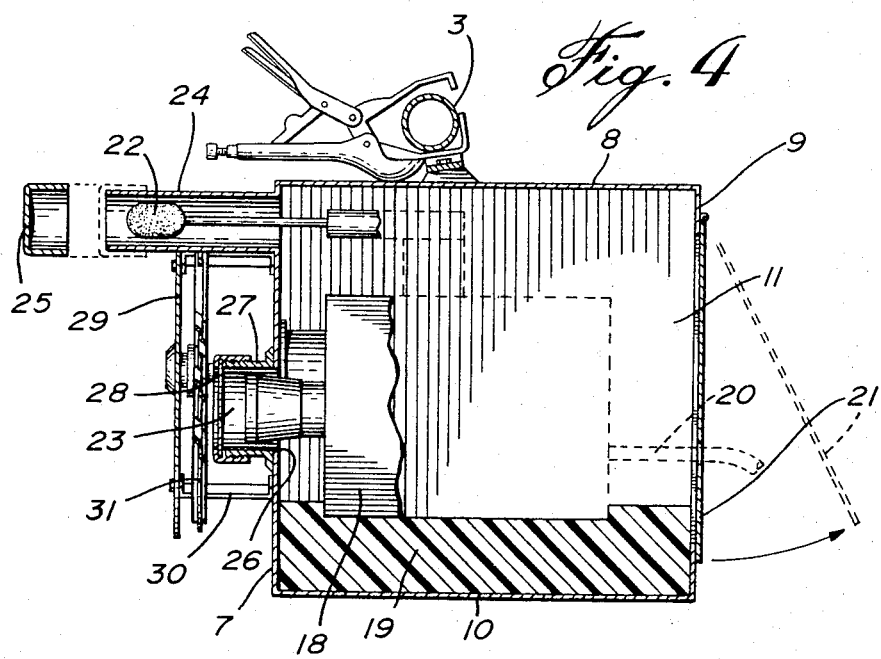

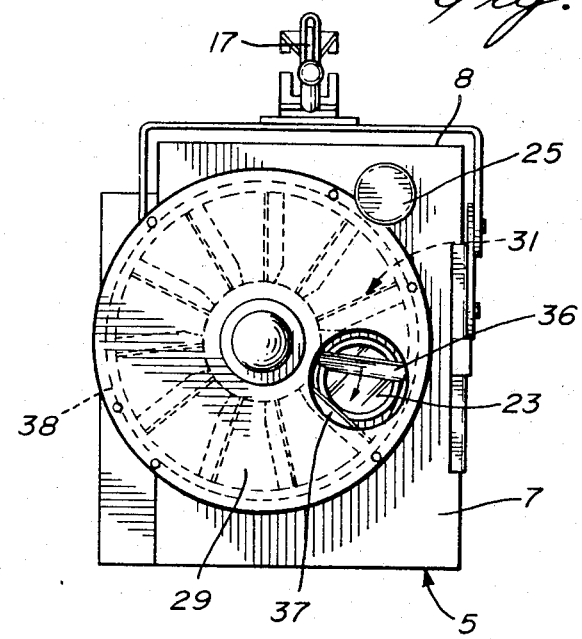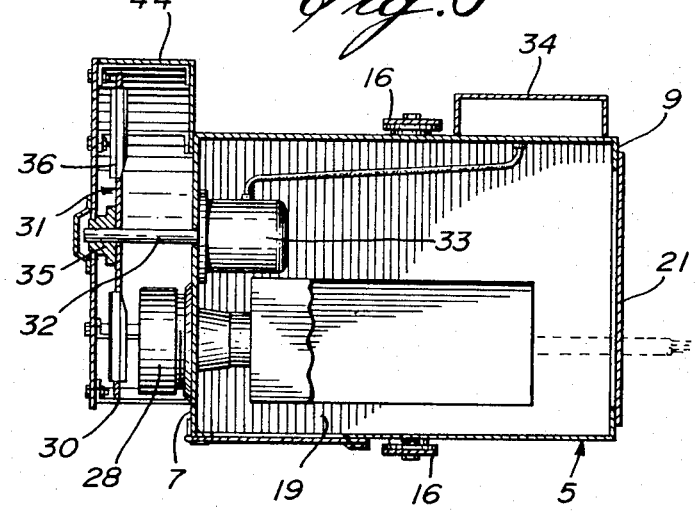

CAMERA-PROTECTING APPARATUS INCLUDING A FAN FOR DEFLECTING PARTICLES

FIELD OF THE INVENTION

This invention relates to an apparatus for deflecting away from the lens of a camera, dirt and the like particles thrown at it, without obstructing the image seen by the lens.

BACKGROUND OF THE INVENTION

Known glass-wipers which provide a blade in contact with and sweeping a glass surface, are not suitable for the above-noted purpose, since any dirt adhering to a camera lens or to its transparent cap will scratch the same if mechanically swept away, and since such wiper would obstruct the image as seen by the lens.

OBJECTS OF THE INVENTION

It is accordingly an essential object of the invention to provide an apparatus for deflecting away from the lens of a camera, dirt particles which might be thrown at it.

It is another object of the invention to provide an apparatus of the above type, which will not substantially affect the quality of the image as seen by the camera lens.

Another object of the invention is to provide an apparatus of the character described, which is of simple and inexpensive construction.

SUMMARY OF THE INVENTION

The apparatus in accordance with the invention includes a box-like housing for enclosing a camera, with the camera lens or objective protruding from the front wall of the housing. A motor-driven fan is rotatably carried by the front wall of the housing for rotation about an axis eccentric to the camera lens and with its blades movable across and forwardly of the camera lens. The fan blades are preferably protected against dirt by a plate connected to the housing and disposed in front of the fan and having an opening in registry with the camera lens. The camera, when used with the protecting device of the invention, is more particularly adapted to be suspended from a selky behind the horse, so as to record for later analysis the leg movements of the horse. In this manner, a horse trainer can much more easily detect any walking or trotting defect and take correcting measures accordingly, for instance fitting new corrected horse-shoes.

BRIEF DESCRIPTION OF THE DRAWINGS

FIG. 3 is an enlarged side view of the embodiment of FIG. 1;

FIG. 4 is a front-to-rear sectional view of the embodiment of FIG. 1, with a cut-away view of the camera;

FIG. 5 is a front view of the embodiment of FIG. 1;

FIG. 6 is a top plan section of the embodiment of FIG. 1;

Like reference numbers refer to like elements throughout the drawings.

DETAILED DESCRIPTION OF THE DRAWINGS

Figure 1:
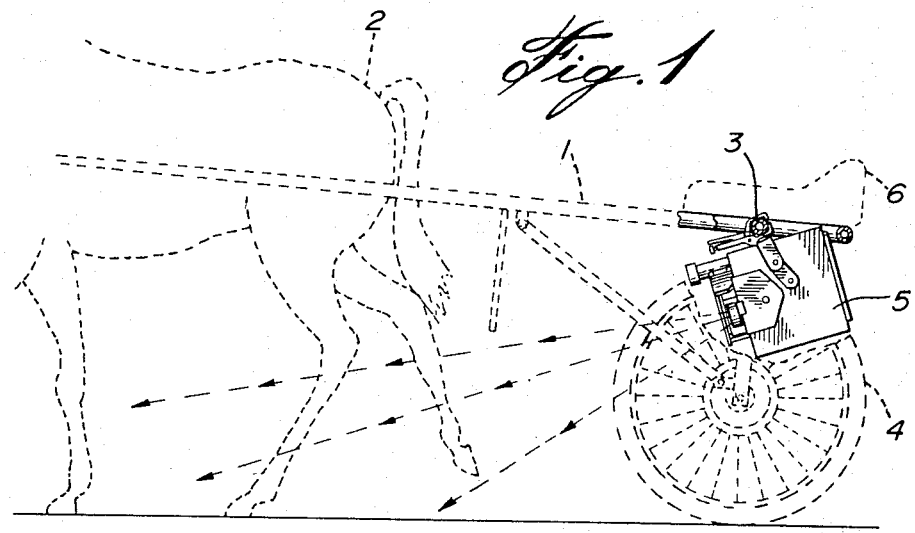
FIG. 1 is a lateral view of an embodiment of the invention, as operatively connected to a horse-drawn selky, the latter and the horse being shown in phantom lines, part of the selky frame being shown in full line.
Figure 2:
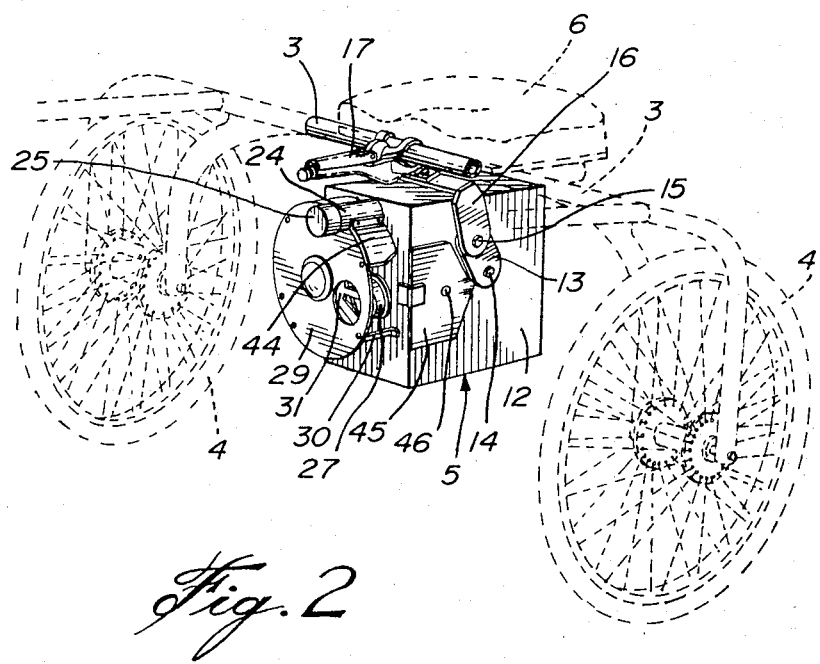
FIG. 2 is a perspective view of the embodiment of FIG. 1.

FIGS. 1 and 2 show a specific application of the invention. A selky, generally shown at 1 and of conventional construction, is adapted to be pulled by a horse 2 for races. During horse training, it is desirable to photograph, by means of a cine-camera, the leg movement of the horse, so as to facilitate the task of the trainer who can much better appreciate any faulty leg movement of the horse and, thus, can be in a better position to take corrective steps, such as modifying the horse-shoes. However, the horse legs can throw dirt, stone particles and the like onto the camera lens.

The apparatus of the invention is designed to protect the camera lens. As shown in FIGS. 1 and 2, the selky 1 has a transverse frame bar 3 bent at both ends to support the road-engaging wheels 4.

The invention consists in a box-like housing 5 adapted to be suspended from the center part of transverse bar 3 just underneath the selky seat 6. Box 5 is generally of cubic shape, having a front wall 7, a top wall 8, a rear wall 9, a floor 10 and side walls 11 and 12. The box is suspended from the transverse bar in such a manner so that the front wall can be tilted frontwardly or rearwardly, so as to properly direct the camera lens towards the horse legs. In the same manner, the position of the box 5, transversely of the selky, can be adjusted. To this end, arms 13 are pivotally connected at 14 to both side walls 11 and 12, and these arms are in turn pivotally connected at 15 to the ends of a yoke 16, which extends over the box and is secured at its center to the transverse bar 3 of the selky by any removable means, such as pipe spanner 17. The box 5 is designed to contain in a dust-proof manner a camera 18, as shown in FIG. 4. The floor 10 of the box is preferably interiorly lined with a thick padding 19, of rubber or cellular material, such as cellular synthetic resin, for supporting the camera and protect the same against jarring. The camera 18 is preferably a cine-camera of the video type and is connected by a cable 20 to a video recorder housed in a box, not shown, and carried by the selky frame. The rear wall 9 of the box 5 is provided with a pivotable door 21, to gain access to the camera, and which closes in air-tight manner. The type of camera used is normally provided with its own microphone 22 protruding forwardly from the camera box to a much greater degree than the camera lens mounting 23. Since the microphone 22 is not used for the specific application, it is protected against dirt and other particles by being inserted within a tube 24 secured to the front wall 7 of the box 5 and in communication with the inside of the same. The tube 24 is normally closed by a cap 25.

The lens mounting 23 protrudes through an opening 26 made in the front wall 7 of box 5. The lens mounting or camera objective is protected by being surrounded by a sleeve 27 secured to the front wall of the box, and the lens themselves are preferably covered by a transparent cap 28 fitting over sleeve 27.

A circular protector plate 29 is secured to the box 5 and, more particularly, to the front wall 7 by means of bolts and spacers 30. This protector plate 29 is mounted parallel to the front wall 7 and eccentric from the lens opening 26. A fan, generally indicated at 31, is secured to the shaft 32 of an electric motor 33 fixed to the front wall 7 inside the box, with the shaft 32 extending through said front wall and mounted concentric with the circular protector plate 29, that is eccentric to the sleeve 27 and lens opening 26.

The electric motor 33 is driven from batteries located in a container 34 fixed to the side wall 11 of the box 5. The fan 31 has a hub 35 and a plurality of radial blades 36. The fan rotates in a plane parallel to the front wall 7 of the box 5 and between said front wall and the protector plate 29 and, more specifically, between said protector plate and the protector transparent cap 28 covering the lens of the camera. Only the blades 26 travel across the field of vision of the camera lens and these blades do not touch either the camera lens or the transparent cap 38. Protector plate 29 is obviously provided with a circular opening 37 in register with the camera lens and with the transparent cap 28 and of such a diameter as not to obstruct the field of vision of the camera lens.

Figure 7:
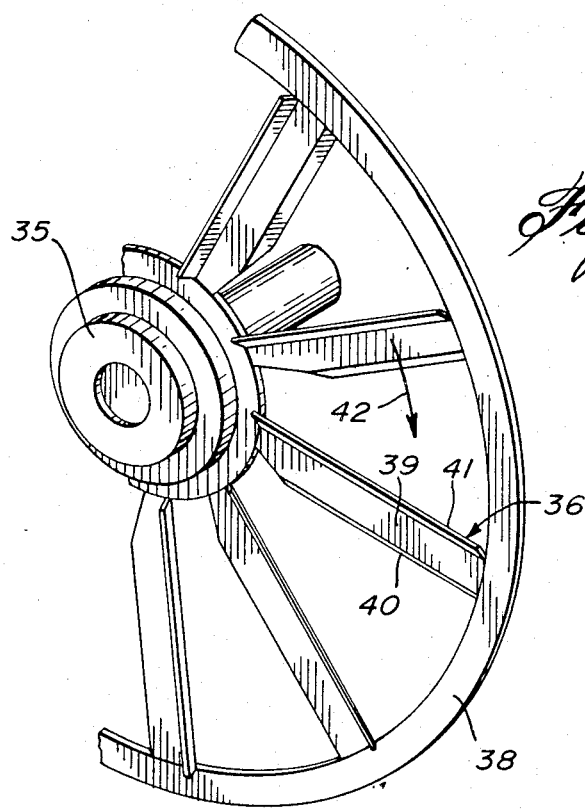
FIG. 7 is a partial perspective view of the electrically-operated fan of the invention.

As shown in FIG. 7, the blades 36 are reinforced by a circular ring member 38 fixed to the tip of the blades. Each blade, when seen in cross-section, as shown in FIG. 8, is formed of a central flat strip 39 disposed in the plane of rotation of the fan and which is bent along its longitudinal marginal portions to form oppositely-inclined marginal portions 40 and 41, which are inclined forwardly and backwardly at the same angle, so that the marginal strip portions 40 and 41 are substantially parallel to each other.

Figure 8:
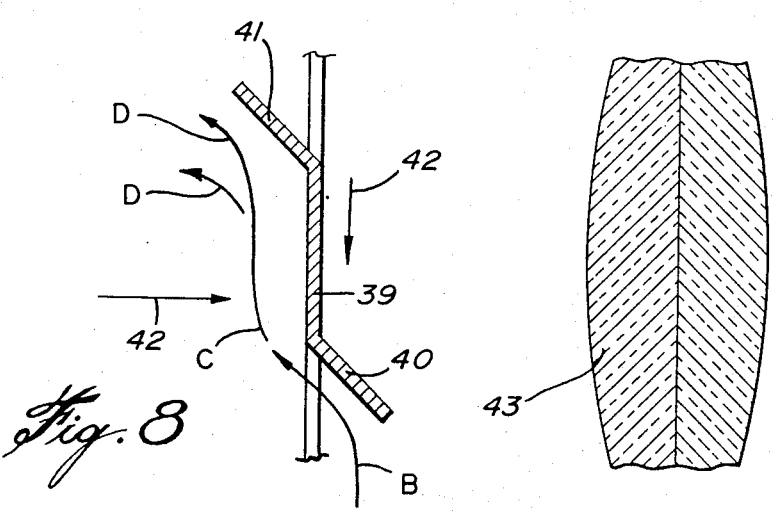
FIG. 8 is a cross-section of one blade of the fan of FIG. 7.

As shown in FIG. 8, supposing the fan rotation is indicated by arrow 42 and the camera lens indicated at 43 is on the right-hand side of the fan; the upstream marginal portion 40 is bent towards the lens 43 while the downstream marginal portion 41 of the fan blade is bent away from lens 43. Therefore, any dirt particles or the like thrown by the horse legs, or from any other source and directed towards the lens 43, will be deflected away from the lens either by the upstream marginal portion 40 or the main strip portion 39, or the downstream marginal portion 41. At the same time, the fan blades serve to deflect the air flow in accordance with arrows B, C, D, thus setting up an air flow away from the camera lens 43, further assisting in the deflecting of particles which might travel through the fan.

The width of the fan blades is relatively small and the ring 38 at the periphery of the fan is outside the field of vision of the camera lens. The fan is made to rotate at a sufficient speed, so as to practically not impair the quality of the image recorded by the camera. At the same time, the fan effectively prevents any dirt from hitting or sticking to either the camera lens if left unexposed or on the transparent cap 28.

Preferably, a curved plate 44 is fixed around a portion of the periphery of the circular protector plate 29 and to the front wall 7 of the box 5, so as to protect the fan 31. This curved plate 44 preferably extends over the top portion of the fan and along the side of the fan corresponding to the side wall 11 of the box, that is on the opposite side from where the camera objective 23 is located.

Side wall 12 is preferably further provided with a door 45 to gain access to the camera controls, said door being normally kept closed by a lock 46, as shown in FIG. 3.

What I claim is:

1. A camera-protecting apparatus comprising a box adapted to receive a camera therein and having a front wall, said front wall having an opening through which the objective of the camera may extend, a fan mounted on said front wall for rotation in a plane parallel to and forwardly spaced from said front wall and about an axis which is eccentric to said front wall opening, motor means located in said box for driving said fan in rotation, said fan having a hub completely out of register with said front wall opening and having radial blades movable across said front wall opening, so as to deflect away from the camera objective any dirt or the like particles thrown towards the same.

2. An apparatus as claimed in claim 1, further including a protector plate secured to the front wall of said box forwardly of said fan and parallel to the plane of rotation of said fan and co-extensive therewith to protect the same, said protector plate having an opening in register with the opening of said front plate and of a sufficient diameter to accommodate the field of vision of the objective of the camera located in said box.

3. An apparatus as claimed in claim 2, further including a curved plate extending spacedly about a portion of the periphery of said fan and disposed between said box front wall and said protector plate, said plate terminating short of said front wall opening and of said protector plate opening.

4. An apparatus as claimed in claim 1, wherein said motor means is an elecric motor secured to the inside of said box and said box further includes a compartment for housing batteries to drive said electric motor.

5. An apparatus as claimed in claim 1, wherein said blades are formed of elongated strips having a central longitudinal portion disposed in the plane of rotation of the fan and having longitudinal upstream and downstream marginal portions oppositely inclined with respect to said plane, the upstream marginal portions being directed towards the front wall opening and the downstream marginal portion being directed away from said front wall opening.

6. An apparatus as claimed in claim 5, wherein said marginal portions are substantially parallel to each other.

7. An apparatus as claimed in claim 1, further including a narrow ring secured to the tip of said blades to reinforce the same.

8. An apparatus as defined in claim 1, further including means to suspend said box from the transverse bar of a horse-drawn selky, said means including means to adjust the inclination of said box.

* * * * *